US007178797B2

(12) United States Patent
Migliori

(10) Patent No.: US 7,178,797 B2
(45) Date of Patent: Feb. 20, 2007

(54) COMPACT CLAMPING DEVICE WITH SIDE CLAMPING MEMBER

(75) Inventor: Luciano Migliori, Milan (IT)

(73) Assignee: Univer S.p.A., Milan (IT)

( * ) Notice: Subject to any disclaimer, the term of this patent is extended or adjusted under 35 U.S.C. 154(b) by 197 days.

(21) Appl. No.: 10/890,254

(22) Filed: Jul. 14, 2004

(65) Prior Publication Data

US 2005/0012258 A1 Jan. 20, 2005

(30) Foreign Application Priority Data

Jul. 16, 2003 (IT) .......................... MI2003A1454

(51) Int. Cl.
*B23Q 3/08* (2006.01)

(52) U.S. Cl. ........................................................ 269/32

(58) Field of Classification Search .................. 269/32, 269/49, 47, 34, 52, 93; 279/2.06, 2.09
See application file for complete search history.

(56) References Cited

U.S. PATENT DOCUMENTS 3,027,155 A * 3/1962 Paterson ...................... 269/32
6,364,300 B1 4/2002 Kita
2001/0013164 A1 8/2001 Morel et al.
2002/0093131 A1 7/2002 Dugas et al.

FOREIGN PATENT DOCUMENTS

| | | |
|---|---|---|
| DE | 39 36 396 | 4/1991 |
| DE | 89 13 386 | 4/1991 |
| DE | 299 22 064 | 5/2000 |
| EP | 0 163 219 | 12/1985 |
| EP | 1 250 984 | 10/2002 |

* cited by examiner

*Primary Examiner*—Robert C. Watson
(74) *Attorney, Agent, or Firm*—Young & Thompson

(57) ABSTRACT

The toggle-lever clamping device comprises a box-shaped body provided with a clamping member movable between an advanced and a retracted position in which it disengages and respectively locks a work piece. The clamping member is arranged on a side of the box-shaped body and is operatively connected to a linear actuator by an articulated quadrilateral system and an intermediate toggle-lever connecting link. The clamping member extends from the box-shaped body in a substantially orthogonal direction to the linear actuator, and the articulated quadrilateral system and the intermediate toggle-lever link are constructed and arranged to transform a linear movement of the actuator into a composite racking and linear movement of the clamping member to retain and disengage a work piece.

7 Claims, 2 Drawing Sheets

COMPACT CLAMPING DEVICE WITH SIDE CLAMPING MEMBER

BACKGROUND OF THE INVENTION

This invention relates to a toggle-lever clamping device for clamping work pieces, in particular for clamping and/or centring metal sheets or work pieces in the manufacture of motor vehicles, such as cars, trucks and for other similar uses.

STATE OF THE ART

Clamping devices are known, which are normally used for clamping and/or centring work pieces, along edges or through appropriate holes in the same work pieces, locking them against a shoulder surface on the device, or against an external holding structure.

Clamping devices of this type are known and described for example in DE 39 36 396, U.S. Pat. No. 6,364,300, US 2002/0093131, and US 2001/0013164.

In particular, DE 39 36 396 describes a toggle-lever clamping device for clamping work pieces, comprising a box-shaped body extending in a longitudinal direction, and a clamping member movable between a forward or advanced position in which it disengages a work piece, and a backward or retracted position in which it retains the work piece in which the clamping member is operatively connected to a linear actuator having an axis oriented in the longitudinal direction of the box-shaped body of the clamping device.

The clamping member is connected to the linear actuator by means of an articulated quadrilateral system and an intermediate toggle-lever mechanism comprising a connecting link.

The clamping member in such device extends from the box-shaped body in a direction parallel to the longitudinal axis of the linear actuator, while the articulated quadrilateral system and the intermediate connecting link are constructed and arranged in such a way as to cause the clamping member to perform a movement in a direction substantially parallel to the longitudinal axis of the linear actuator.

A device of this type consequently has considerable overall dimensions in the longitudinal direction, in that the coupling member, and the linear actuator both extend in the same direction.

The excessive length of the clamping device constitutes a drawback in that it is limiting the possibility to use the same in some working conditions, due to the fact that, for example, in the construction of motor vehicles an assembling line usually has limited spaces for the insertion and operation of clamping devices, resulting in restriction in the freedom of movement of the work pieces and the devices themselves, or, at the most, in the impossibility of their use.

OBJECT OF THE INVENTION

An object of this invention is to provide a toggle-lever clamping device for clamping work pieces, of the aforementioned type, which is structurally simple, and which has limited overall dimensions in the direction in which the clamping member extends and moves, thereby enabling the same clamping device to be used in different situations where the space available for positioning and operating the device is very restricted.

BRIEF DESCRIPTION OF THE INVENTION

More precisely, according to the invention a toggle-lever clamping device has been provided comprising:

a box-shaped body which extends in a longitudinal direction;

a linear actuator having a longitudinal axis parallely arranged to the longitudinal direction of the box-shaped body of the device; and at least one clamping member, protruding from an opening of the box-shaped body, said clamping member being movable between an advanced position in which it disengages a work piece, and a retracted position in which it retains the work piece;

said clamping member being operatively connected to the linear actuator by an articulated quadrilateral system and an intermediate toggle-lever mechanism comprising a connecting link, characterised in that the clamping member extends from a side of the box-shaped body in a cross-wise direction in respect to the box-shaped body and the longitudinal axis of the linear actuator, and in that the articulated quadrilateral system and the intermediate toggle-lever connecting link are constructed and arranged as to transform the linear movement of the actuator into a composite rocking and linear movement of the clamping member with respect to the said cross-wise direction of the box-shaped body and the longitudinal axis of the actuator.

BRIEF DESCRIPTION OF THE DRAWINGS

These and further features according to this invention, will be more clearly evident from the following description with reference to the accompanying drawings, in which.

DETAILED DESCRIPTION OF THE INVENTION

The general features of this invention will be illustrated hereunder by means of a preferential embodiment.

Figure 1:
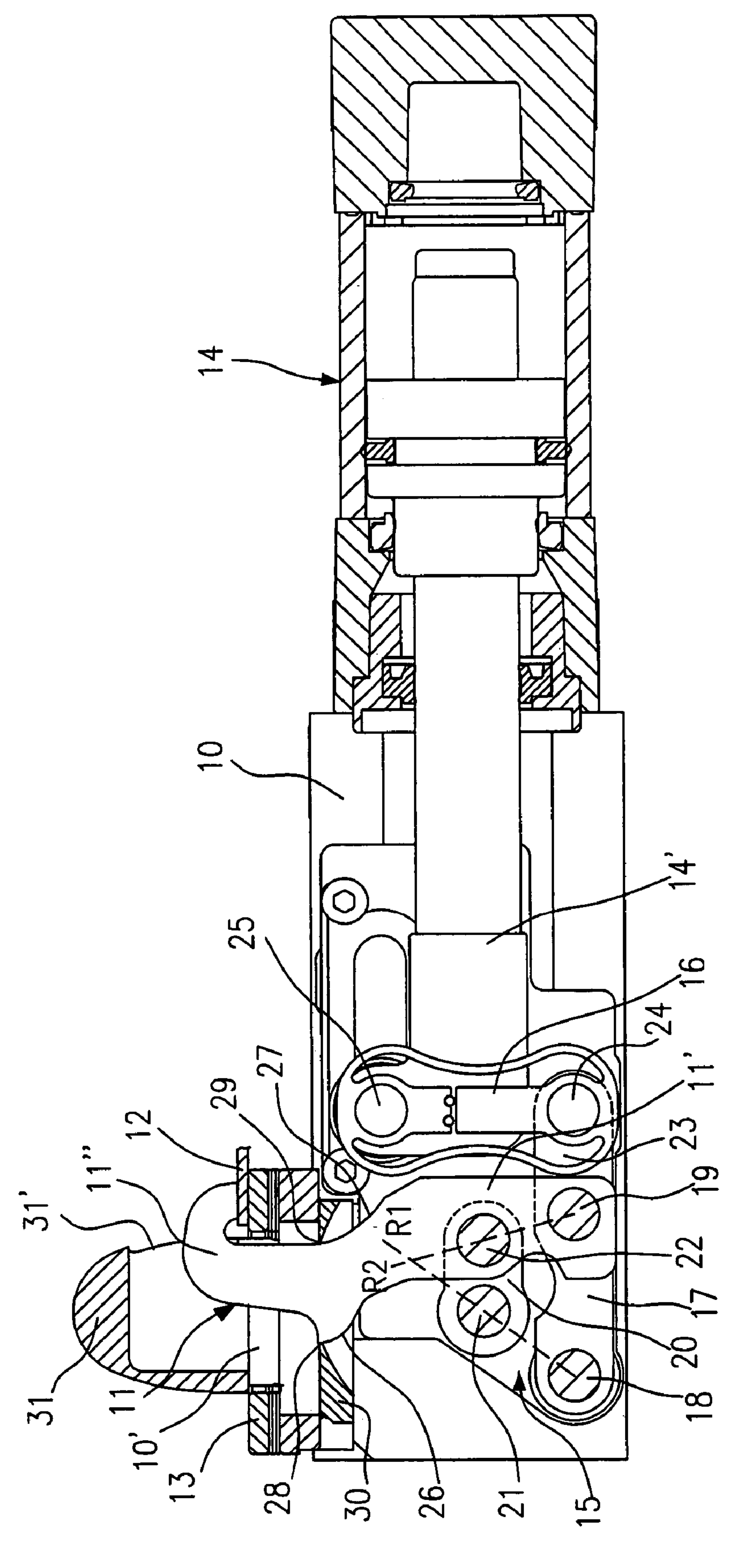
FIG. 1 shows a longitudinal cross-sectional view of a clamping device, with the clamping member in the retracted position in which it retains a work piece.
Figure 2:
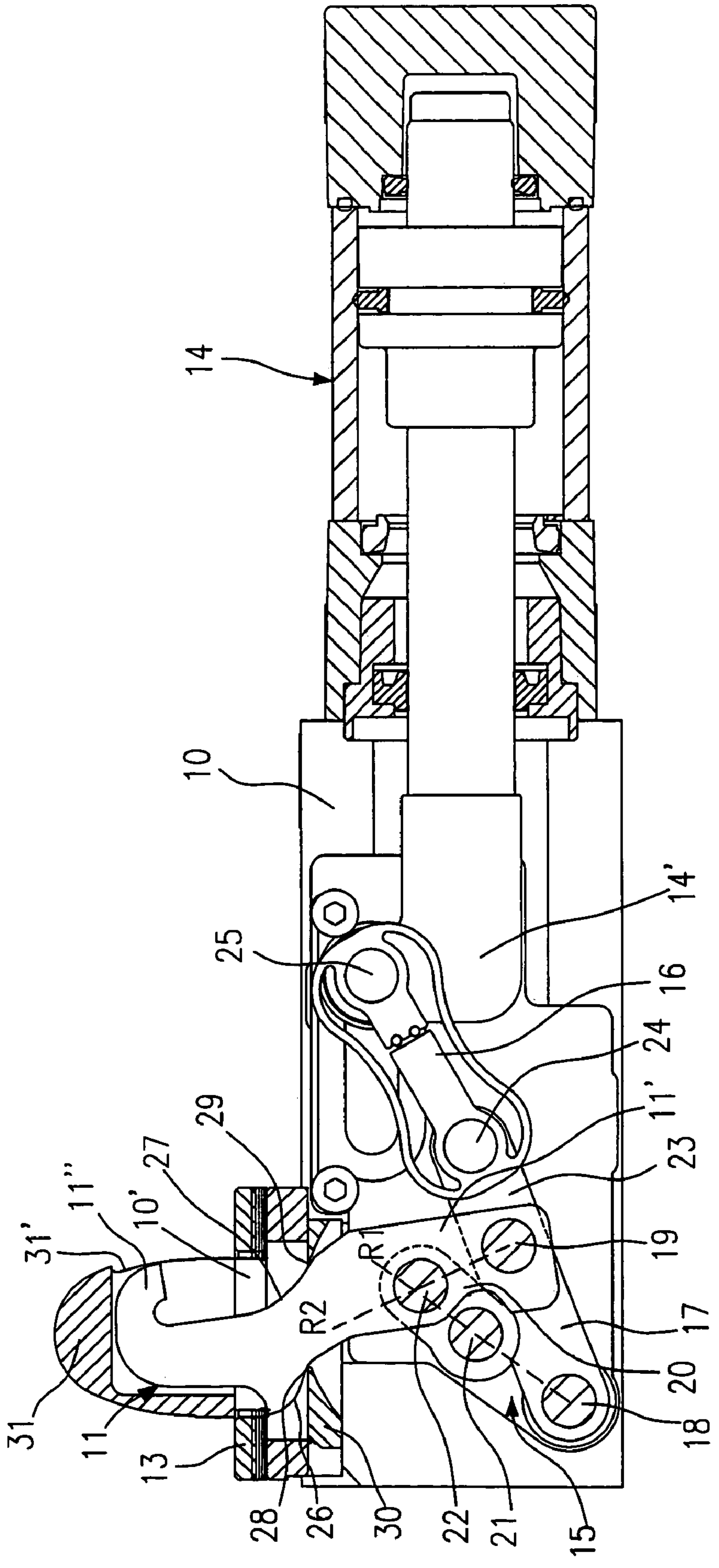
FIG. 2 shows a longitudinal cross-sectional view of the clamping device of FIG. 1, with the clamping member in the advanced position in which it disengages the work piece.

A toggle-lever clamping device for clamping work pieces according to the invention, as shown in FIGS. 1 and 2, comprises a box-shaped body 10 extending in a longitudinal direction, which supports at least one clamping member 11 which protrudes from a side aperture 10' of the box-shaped body 10, as shown.

The clamping member 11 is movable between a forward position in which it disengages a work piece 12 and a backward position in which it retains the work piece, and is provided with a shank 11' ending with a hook-shaped portion 11" protruding from an aperture in a side wall of the body 10, to retain a work piece 12 against a shoulder surface of the same device, comprising for example a support plate 13 secured to the box-shaped body 10, the support plate 13 being provided with a longitudinal aperture aligned with a longitudinal aperture in the side wall of the body 10, from which the hook-shaped portion 11" of the clamping member 11 protrudes.

Fastened to one end of the box-shaped body 10 is a linear actuator 14, for example a pneumatic cylinder or an electric actuator having a longitudinal axis oriented in the longitudinal direction of the box-shaped body 10, and orthogonally arranged in respect to the clamping member 11 of the device; therefore the clamping member 11 extends from a side wall of the box-shaped body 10, in a direction substantially orthogonal to the longitudinal axis of the linear actuator 14.

The clamping member 11 is operatively connected to the linear actuator 14 by means of an articulated quadrilateral system 15 and an intermediate toggle-lever mechanism comprising a connecting link 16. Preferably the connecting link 16 is in the form of an elastically yieldable link member conformed to be elastically yieldable in its longitudinal direction link, and comprises spaced apart stop means arranged to limit the axial compression of the same connecting link 16, as described in EP 1 250 984 of the same inventor.

According to present invention, the articulated quadrilateral system 15 and the connecting link 16 are constructed and arranged in such a way as to transform a linear movement of the actuator 14 into a rocking movement of the clamping member 11 combined with a linear movement of the same clamping member 11 in a direction orthogonal to the longitudinal axis of the linear actuator 14.

In particular, the articulated quadrilateral system 15 comprises a first rod 17 pivotally supported by the box-shaped body 10 to rotate according to a first pivotal axis 18; the rod 17 is connected to the end of the shank 11' of the clamping member 11 by means of a first hinge axis 19.

The articulated quadrilateral system 15 also comprises a second rod 20 of shorter length than the preceding rod 17, which is pivotally supported by the box-shaped body 10 to rotate according to a second pivotal axis 21; the second rod 20 is in turn connected to the shank 11' of the clamping member 11 by means of a second hinge axis 22, spaced apart from the hinge axis 19, in an intermediate position of the shank 11' of the clamping member 11.

The pivotal axes 18,21 of the first and second rods 17,20 are disposed on a side of the clamping member 11 which is opposite the linear actuator 14, in respect to the connecting link 16.

The first rod 17 comprises a lever arm 23 which extends beyond the hinge axis 19 of the same rod 17, for connection to the clamping member 11 in the direction of the linear actuator 14; said lever arm 23 of the first rod 17 is connected by means of a first hinge axis 24 to the intermediate connecting link 16 which in turn, by means of a second hinge axis 25, is connected to a thrust member 14' of the fore end of the rod of the linear actuator 14, for example the piston rod of a pneumatic cylinder.

The aforesaid first and second hinge axis 24 and 25 of the intermediate toggle-lever connecting link 16 are preferably arranged on opposite sides with respect to the longitudinal axis of the linear actuator 14, in both advanced and retracted conditions of the clamping member 31.

The first connecting rod 17 of the articulated quadrilateral system 15, through its extension arm 23, and the intermediate connecting link 16 constitute a toggle-lever mechanism having a per se known dead centre point, which corresponds to an irreversible movement condition for the clamping member 11 in its backward or retracted position in which it retains a work piece.

The pivotal axes 18,21 and the hinge axes 19,22 of the articulated quadrilateral system 15 lie on respective straight lines R1 and R2 which converge towards the clamping member 11; the angle formed by the straight line R1 passing through the pivotal axes 18,21, with the straight line R2 passing through the hinge axes 19,22 of the articulated quadrilateral system 15, preferably ranges between 40° and 60°, in the backward position in which it retains the coupling member 11.

The ratio between the length of the first rod 17 and the length of the second rod 20 of the articulated quadrilateral system 15 preferably ranges between 2 and 2.5.

The clamping member 11 has a first and a second lateral edges 26,27 shaped in such a way as to remain in contact with respective scraping edges 28,29 of a cleaning member in the form of a plate 30 secured to the box-shaped body 10.

The clamping device can comprise a centring member 31 for centring the work pieces, for example in the form of a dowel pin which fits into an appropriate hole in the work pieces. The centring member 31 is provided with a side open cavity for housing the clamping member 11 in its forward position, as shown in FIG. 2, thereby enabling the centring member 31 to be secured to the box-shaped body 10 above the clamping member 11 itself; the centring member 31 is therefore provided with a side slot 31' from which the clamping member 11 protrudes when moved into the backward position in which it retains a work piece, as shown in FIG. 1.

A clamping device according to the invention is therefore of limited dimensions in the cross-wise or moving direction of the clamping member 11, thereby enabling the device to be used also in situations where the space available for positioning and operating the device is very restricted.

What has been described and shown with reference to the accompanying drawings has been given purely by way of example in order to illustrate the general features of the invention, and of one of its preferential embodiments; consequently other modifications and variations to the coupling device for coupling work pieces are possible, without thereby deviating from scope of the claims.

I claim:

1. Toggle-lever clamping device for clamping work pieces, comprising:

a box-shaped body that extends in a longitudinal direction;

a linear actuator having a longitudinal axis parallely arranged to the longitudinal direction of the box-shaped body of the device; and at least one clamping member protruding from an opening of the box-shaped body, said clamping member being movable between an advanced position in which it disengages a work piece, and a retracted portion in which it retains the work piece, said clamping member being operatively connected to the linear actuator by means of an articulated quadrilateral system and an intermediate toggle-lever mechanism comprising a connecting link, wherein the clamping member extends from a side of the box-shaped body in a crosswise direction in respect to the box-shaped body and the longitudinal axis of the linear actuator, wherein the articulated quadrilateral system and the intermediate toggle-lever connecting link are constructed and arranged as to transform the linear movement of the actuator into a composite rocking and linear movement of the clamping member wit respect to the crosswise direction of the box-shaped body and the longitudinal axis of the actuator, and wherein the articulated quadrilateral system comprises a first rod pivotally supported by the box-shaped body to rotate on a first pivotal axis, said first rod being connected to the clamping member by a first hinge axis;

said articulated quadrilateral system comprising a second rod having a length shorter than said first rod, the second rod being pivotally supported by the box-shaped body to rotate on a second pivotal axis, said second rod in turn being hingedly connected to the clamping member by a second hinge axis, wherein the pivotal axes of said first and second rods, with respect to the connecting link, are disposed on a side of the clamping member which is opposite to the side of the linear actuator, and wherein the first rod of the articulated quadrilateral system comprises a lever arm operatively connected to the linear actuator by the intermediate toggle-lever connecting link.

2. A clamping device according to claim 1, in which the intermediate toggle-lever connecting link comprises first and second hinge axes connected to the lever arm of the first rod, respectively to a pushing member of the linear actuator, characterised in that said first and second hinge axes of the intermediate toggle-lever connecting link are disposed on opposing sides with respect to the longitudinal axis of the linear actuator.

3. A clamping device according to claim 1, wherein the pivotal axes and the hinge axes of said first and second rods lie on respective straight lines converging towards the clamping member.

4. A clamping device according to claim 3, wherein the straight line passing through the pivotal axes, and the straight line passing through the hinge axes of the rods form an angle ranging between 40° and 60°, in the backward position of the clamping member.

5. A clamping device according to claim 1, wherein the ratio between the length of the first rod and the length of the second rod of the articulated quadrilateral system ranges from 2 to 2.5.

6. A clamping device according to claim 1, further comprising a hollow centering member for a work piece secured to the box-shaped body for housing the clamping member in the advanced position, said centering member being provided with a seating having an open side slot from which the clamping member protrudes in its backward position to retain the work piece.

7. A clamping device according to claim 1, wherein the clamping member has a first and a second shaped side edges conformed to contact respective opposite scraping edges of a cleaning member during movement of clamping member between said advanced and retracted positions.

* * * * *